UNITED STATES PATENT OFFICE.

ALEXANDER W. ROWLAND, OF WILSON, NORTH CAROLINA.

IMPROVEMENT IN FERTILIZERS.

Specification forming part of Letters Patent No. 178,194, dated May 30, 1876; application filed April 26, 1876.

*To all whom it may concern:*

Be it known that I, ALEXANDER W. ROWLAND, of the town and county of Wilson and State of North Carolina, have invented a new and Improved Fertilizing Compound; and I do hereby declare that the following is a full, clear, and exact description of the same.

My invention relates to an improved fertilizing compound, which consists of wood-ashes, cotton-seed, rich surface earth, stable-manure, sulphate of magnesia, chloride of sodium, sulphate of soda, sulphate of ammonia, nitrate of soda, pure dissolved bone, and ground plaster, compounded in the manner, and in or about the proportions hereinafter named.

In carrying out my invention, I take of unleached wood-ashes, three bushels; of cotton-seed, three bushels; of dry rich surface earth, clear of stone, turf, and sticks, twenty bushels; of either stable-manure, dry and clear of straw, or well-rotted wood-pile manure, twenty bushels, which ingredients are mixed thoroughly together. I then take of sulphate of magnesia, five pounds; of chloride of sodium, fifteen pounds; of sulphate of soda, twenty-five pounds; of sulphate of ammonia, thirty pounds; of either nitrate of soda or nitrate of potash, forty pounds, and dissolve these salts in ten common-sized wood-bucketfuls of water. Upon a layer of the first mixture two or three inches deep and about eight feet square sprinkle of the solution of salts above mentioned enough to moisten well, but not to run. Then, again, spread of the first mixture a layer of the same depth upon the moistened layer, and sprinkle with the solution of salts, as before, and so on, alternating, until the whole of the solution has been added to the mixed solid ingredients. On the top of the heap thus prepared I then spread evenly seventy-five pounds of either ground plaster or slaked lime, and one hundred and eighteen pounds of pure dissolved bone. Now, mix the whole thoroughly together, and let stand a few weeks, when it is ready for use.

This fertilizer can be used for all crops for which other guanos are employed, and, as to its application, can be used in quantities to suit the soil. The quantity herein prescribed will be ordinarily distributed over five acres.

The advantages of this fertilizer rest principally in the cheapness of production, the cost being only about one-fourth that of commercial manures, and yet possessing the same merit as a fertilizer.

Having thus described my invention, what I claim as new is—

The fertilizing compound herein described, composed of unleached wood-ashes, cotton-seed, rich surface earth, stable-manure or its equivalent, hereinbefore described, sulphate of magnesia, chloride of sodium, sulphate of soda, sulphate of ammonia, nitrate of soda or its equivalent, hereinbefore described, dissolved bone, and ground plaster or its equivalent, hereinbefore described, in or about the proportions herein specified.

ALEXANDER W. ROWLAND.

Witnesses:
L. A. STITH,
E. C. WOODSON.